Dec. 31, 1963     E. M. ROTHERMEL     3,115,898

FLEXIBLE HOSE

Filed June 25, 1958     3 Sheets-Sheet 1

INVENTOR.
EDWARD M. ROTHERMEL
BY
Reuben M Wolf
ATTORNEY

Dec. 31, 1963   E. M. ROTHERMEL   3,115,898
FLEXIBLE HOSE

Filed June 25, 1958   3 Sheets-Sheet 2

INVENTOR.
EDWARD M. ROTHERMEL
BY
Reuben Wolf
ATTORNEY

Dec. 31, 1963 E. M. ROTHERMEL 3,115,898
FLEXIBLE HOSE
Filed June 25, 1958 3 Sheets-Sheet 3
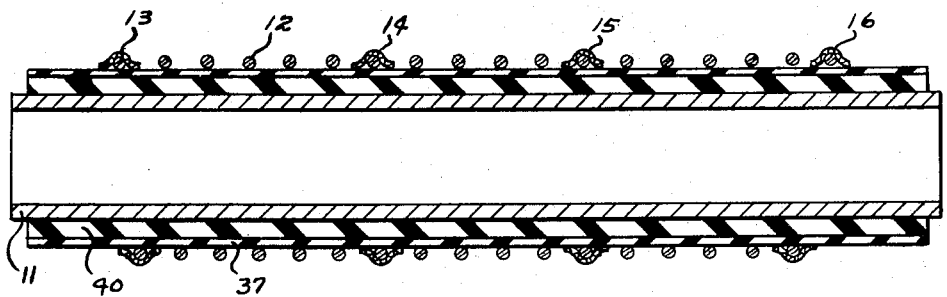
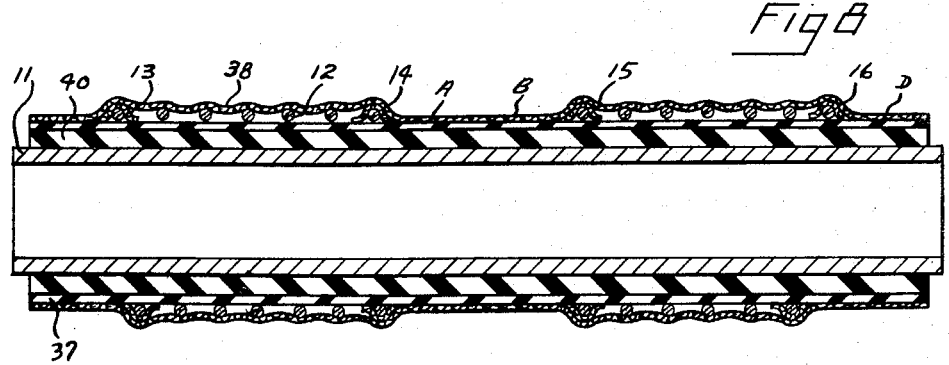
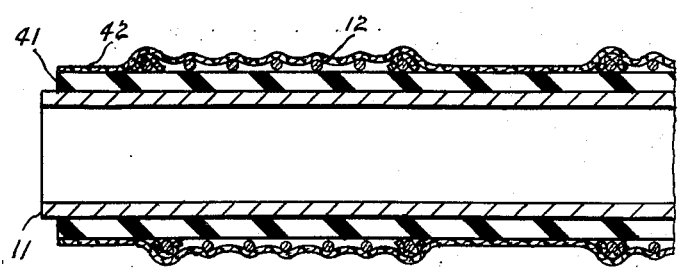
INVENTOR.
EDWARD M. ROTHERMEL
BY Reuben Wolk
ATTORNEY United States Patent Office 3,115,898
Patented Dec. 31, 1963

3,115,898
FLEXIBLE HOSE
Edward M. Rothermel, Waynesville, N.C., assignor to Dayco Corporation, Dayton, Ohio, a corporation of Ohio
Filed June 25, 1958, Ser. No. 744,363
2 Claims. (Cl. 138—122)

This is a continuation-in-part of U.S. application Serial No. 649,727, filed April 1, 1957, now abandoned.

The present invention relates to flexible hose made of rubber or other plastic elastomeric material, and is especially directed to hose adapted for use in radiator connections in motor vehicles. More particularly, the invention relates to hose of the type described, made by a molding operation and having a helical reinforcing member imbedded therein with a smooth molded exterior surface.

Hose of the type described has heretofore generally been made in a plurality of layers with a wire reinforcement imbedded between layers, the respective layers being bonded together by cording down between convolutions of the reinforcement, followed by vulcanization in the corded down condition. Following vulcanization, the cord is removed and the finished hose is obtained with the respective layers united together. Attempts have been made to utilize molds with the elimination of cord, but such attempts have not been completely successful due to complexity to manufacture, failure to retain the position of the wire during molding, emergence of the wire from the surface of the hose, weaknesses in the wall of the hose due to nonuniform structure, and the like.

In accordance with the present invention, applicant has discovered a novel product which obviates the above disadvantages through the use of a novel hose construction and molding procedure.

It is, therefore, an object of the present invention to provide a novel hose construction in which a reinforcing member is imbedded between a plurality of layers of elastomeric material, or between a layer of such material and a layer of fabric.

It is a further object of the present invention to provide a novel hose construction in which the spaced convolutions of the helical reinforcing member are uniformly positioned between layers of the hose construction and in which the surface of the hose will possess a uniform molded configuration.

It is a still further object of the present invention to provide a novel method for the manufacture of hose of the type described having a uniform structure and a high degree of flexibility.

It is another object of the present invention to provide a hose which will be highly flexible and yet at the same time will have a low degree of longitudinal stretch.

Other objects and advantages will be apparent from a consideration of the specification and claims when considered in connection with the attached drawings, in which:

FIGURE 7 is a view similar to FIGURE 1, illustrating a modified form of the first stage of the hose assembly.

FIGURE 8 is a view similar to FIGURE 2, illustrating a modified form of an intermediate stage of the assembly.

FIGURE 9 is a view similar to FIGURE 8, illustrating a further modified form of the intermediate stage.

Figure 1:
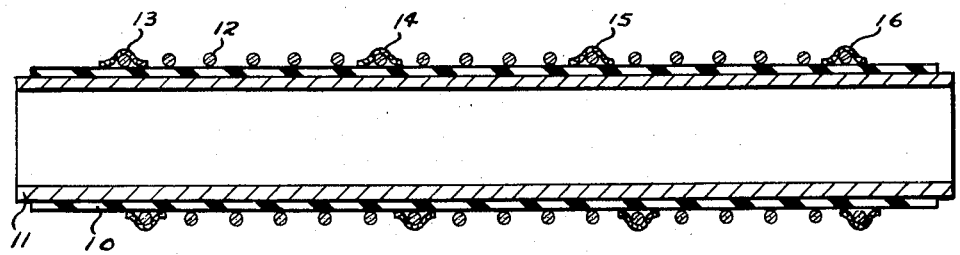
FIGURE 1 is a view in longitudinal cross section illustrating the initial stage of assembly of one form of the hose.

As shown in FIGURE 1 of the drawings, a tube or tubular layer 10 is applied over an elongated mandrel 11. Preferably, this tube is formed by the extrusion of rubber or other elastomeric material to the desired length and thickness. In one modification, the tube is made of neoprene and is semicured by placing a number of tubes on a tray and heating at 300° F. for about 15 minutes. This preliminary curing cuts costs because the mandrels are not tied up as long as they would be if the curing were done entirely on the mandrels. The tube 10 is then blown upon the mandrel 11, the mandrel having the same outer diameter as the inner diameter of the tube. A wire reinforcement 12 is then wrapped around the tube. This reinforcement may be made by forming the wire into a closely wound spring having contacting coils, pulling the spring over the tube, and taping one end 13. The spring is then drawn out to the end of the mandrel with the turns spaced to a desired dimension. The other end 16 of the spring is taped down, and intermediate strips of friction or other suitable tape 14 and 15 are applied depending upon the length of the individual pieces of hose which are to be obtained. At this point the spring is cut between the strips of tape 14 and 15, thus defining the individual hose segments to be obtained, and the portion of the spring between these points is then removed. The result will then be a hose segment defined by taped portions 13 and 14, and another segment defined by 15 and 16, with an intervening unreinforced space therebetween. This space, when the segments are cut at the intermediate point, will define the ends or cuffs A and B of the two hose segments with the opposite ends or cuffs C and D being defined by the area of the tube extending between taped portions 13 and 16 and the other ends of tube 10.

In lieu of forming the spring as described above, it may be prespaced with the desired spacing by forming it directly on the spring machine. When this is done, the spring need not be stretched, but is placed on the tube in the desired location and taped into place. In many cases, the spring has an inside diameter which is greater than the outside diameter of the tube. When this occurs, the spring is brought down to a close contact with the tube by means of a device that places radial pressure on the outside of the spring. This permits the spring to retain its spacing, although the entire spring will be lengthened correspondingly. This practice may also be followed with a spring that has been stretched into position.

Figure 2:
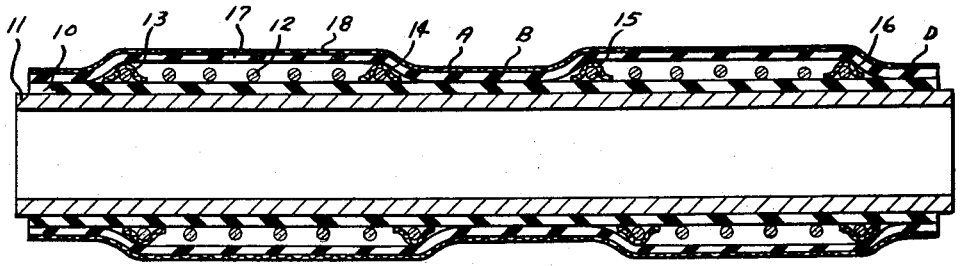
FIGURE 2 is a view in longitudinal cross section of an intermediate stage in the assembly of the hose of FIGURE 1.

As shown in FIGURE 2, the assembly which has resulted from FIGURE 1 with the unnecessary portion of the spring removed is then wrapped with a layer of uncured vulcanizable rubber or the like 17 having external layer 18 of fabric applied thereover. Preferably, layers 17 and 18 are preassembled by forming a sheet of rubber with a layer of fabric adhered thereto by calendering or otherwise skim coating a layer of rubber upon a layer of fabric. Preferably, also, the fabric is bias cut to give it a certain amount of strength and elasticity. This preassembly is then wrapped in a single ply around the whole length of the assembly resulting from FIGURE 1 with the result that the two segments of hose with their reinforcements are defined with the end eras of lesser outside diameter and the intermediate area of lesser outside daimeter defining the ultimate ends or cuffs of the hose segments to be cut from the mandrel. Instead of forming the outer tubular layer by wrapping a sheet of rubber or rubber-fabric around the reinforcing member, a preformed tube may be drawn over the assembly if desired. Obviously, any number of hose segments may be formed in the same manner depending upon the length of the mandrel and the length of the individual segments which are desired to be obtained. The assembly of FIGURE 2 is then cut approximately midway between strips of tape 14 and 15 and the two resulting hose segments are removed from the mandrel.

Figure 3:
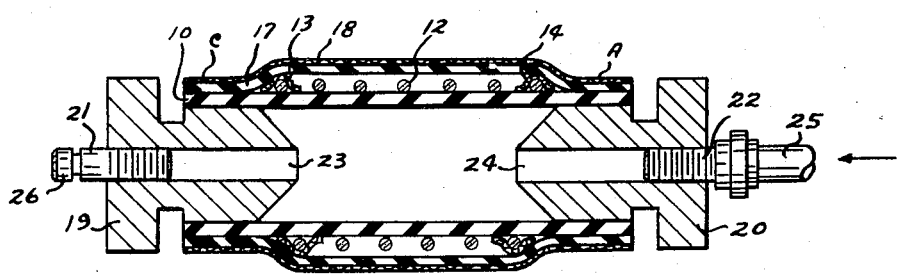
FIGURE 3 is a view in partial longitudinal cross section illustrating a later stage in the manufacture of the hose.
Figure 4:
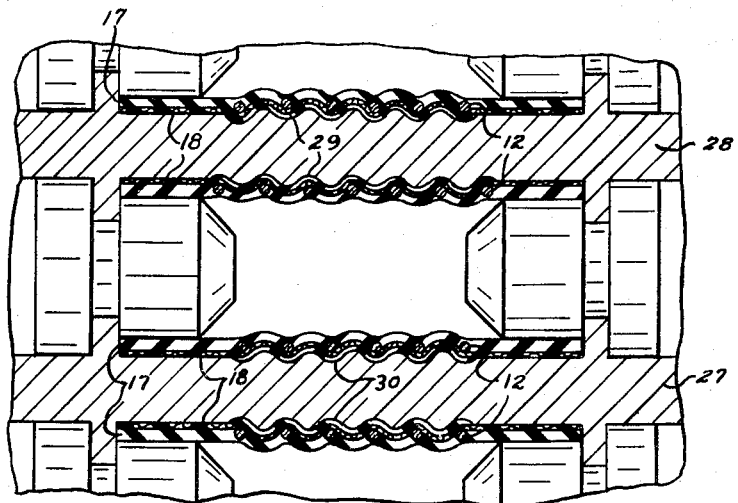
FIGURE 4 is a view in longitudinal cross section illustrating the final stage in the manufacture of the hose.

In the next stage of manufacture, as illustrated in FIGURE 3, each hose segment obtained in the manner described above, after removal from the mandrel, has plug members 19 and 20 inserted in opposite ends thereof. Each of these plugs is formed with centrally located connections 21 and 22 communicating with openings 23 and 24, respectively. The hose connection 25 is attached to connection 22 and a plug 26 is inserted into the end of connection 21. Each hose segment with its plugs inserted into the ends thereof, as illustrated in FIGURE 3, is then introduced into a mold cavity having corrugations 29 and 30, defined by a pair of mold sections 27 and 28. The hose segment is aligned within the cavity so that the individual convolutions are in alignment with the corrugations in the mold, and is preferably made with a diameter slightly less than that of the mold to simplify insertion into the mold. The mold is then closed and envelops the segments as shown in FIGURE 4. Steam, hot air or other heating fluid is passed into one end of the plug 20 which is connected to the hose connection 25. The steam or other fluid is introduced at a temperature of about 330° F. in the case of rubber or neoprene for a period of about 12 minutes at a pressure of about 80 p.s.i. Since the other plug 19 is sealed, the pressure of the steam will force the assembly to assume the configuration of the mold while the elevated temperatures will at the same time effect the cure or vulcanization of the elastomeric material. Plug 26 may be provided with a valve for the bleeding of air or steam or for the removal of condensed water. At the conclusion of the cure, the mold is opened and the vulcanized product with its plugs removed from the mold. After removal of the plugs at the ends, the final product will have the construction illustrated in FIGURES 5 and 6. The resulting product is a hose having a smooth surface with surface corrugations defined by crests 31 and valleys 32 with cuffed ends 33 and 34. The internal construction is composed of tubular layer 10 and outer layers 17 and 18 composed of the rubber coated fabric with the fabric imbedded within the rubber as the result of the internal compression exerted during the curing operation, along with flow of the rubber between and around the threads of the fabric, as shown in the enlarged cross section of the hose illustrated in FIGURE 6. This results in an outer rubber layer of greater thickness at the outer crests of the corrugations than at the troughs thereof. Reinforeecement convolutions 12 are imbedded between the integrally united layers 10 and 17. It should be noted that if desired, the plugs 19 and 20 may be automatically inserted into the ends of the hose segments after they have been placed in the molds.

A particular advantage in using the outer layer of fabric is that air which may be trapped between the layers of rubber and the fabric may escape through the porous fabric rather than becoming entrapped within the rubber or between layers to form damaging blow holes during the curing, through expansion. The resulting product, having fabric at or near the surface, possesses a high degree of resistance to wear and results in a product having a greater dimensional stability, both longitudinally and radially.

A typical method of construction and compositions utilized therein are as follows:

Inner layer composition (semi-cured tube):

| | Parts by weight |
|---|---|
| Neoprene | 100 |
| Zinc oxide | 5 |
| Stearic acid | 1 |
| Sulfur | 1 |
| Accelerator (benzothiazyl disulfide) | 0.75 |
| Antioxidant (mono and diheptyl diphenylamines) | 2 |
| Magnesium oxide | 2 |
| Carbon black | 165 |
| Plasticizer (high molecular weight oil soluble soluble sulfuric acid in paraffin oil) | 25 |

Outer layer composition (uncured tube):

| | Parts by weight |
|---|---|
| Neoprene | 100 |
| Zinc oxide | 5 |
| Magnesium oxide | 4 |
| Stearic acid | 1 |
| Antioxidant (same as above) | 1 |
| Accelerator (same as above) | 1 |
| Carbon black | 75 |
| Plasticizer (same as above) | 10 |
| Sulfur | 1 |

The inner layer tube stock is extruded to the desired diameter and thickness, for example, to 1⅛" I.D. and 0.075" wall thickness and semicured in open steam. The tube is then blown onto a 1⅛" diameter building mandrel, and cleaned with solvent. A layer of rubber cement may then be applied. A precoiled spring formed of 0.045 gauge spring steel wire which has been spun into a 1½" I.D. coil is then drawn over the tube on the mandrel and the convolutions spaced at 7/16" centers. The ends of the spring are taped at predetermined locations along the mandrel to correspond to the desired individual hose assemblies. The wire between hose sections is then cut and removed. Cotton fabric which has been treated by impregnating with rubber, such as by frictioning on both sides with the above outer layer composition, is bias cut on a 45° angle and slit into 5" wide strips. The fabric is then wrapped in one ply around the assembly on the mandrel. The assembly is then cut into individual lengths which are plugged and placed in molds as described above. They are then vulcanized for 10 minutes with 100-lb. steam pressure internally, with the mold held between press platens at about 350° F. Alternatively, the fabric may be skim coated on the under side rather than frictioned on both sides, or else a preassembly of a sheet of rubber and fabric may be made using separate sheets of rubber and fabric. The outer rubber layer and fabric may also be applied separately. Where separate layers are used the fabric may have a gauge of about 0.020" and the rubber a gauge of about 0.025". A similar procedure may be followed using other elastomeric materials. The molds may be of the single or multiple cavity type and may be enclosed between the platens of a hydraulic press during vulcanization in order to retain the segments of the mold in closed condition.

Figure 5:
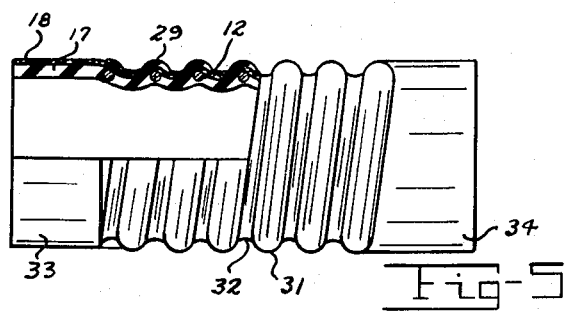
FIGURE 5 is a view in elevation, partly in cross section, illustrating the construction of the final product.
Figure 6:
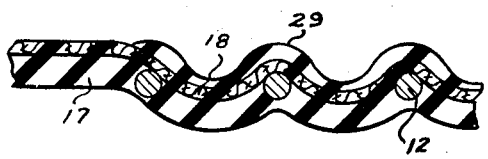
FIGURE 6 is an enlarged sectional view of a portion of the hose shown in FIGURE 5.

A modification of the above invention is illustrated in FIGURES 7 and 8. By this method, a semicured layer or tube 40, similar to tube 10, is blown or wrapped on mandrel 11, after the fabrication procedure already described. However, in this modification an uncured layer 37, identical to layer 17, is wrapped directly upon tube 40. If desired, layer 37 may also be an extruded tube which can be blown over tube 40. A wire reinforcement 12, identical to the one previously described, is placed over the layer 37 and is cut and taped as in the principal form of the invention. These steps are illustrated in FIGURE 7. As shown in FIGURE 8, a fabric layer 38, similar to layer 18, is then wrapped around the entire assembly. This layer may be frictioned, skimmed, or plain as previously described. Segments are produced by cutting approximately midway between strips of tape, and placed in a mold in the same manner as before and the same treating steps are followed. The resultant product is identical to the product of the principal form of the invention, as shown in FIGURES 5 and 6. This is due to the fact that the rubber will flow through the fabric layer in much the same fashion by both methods and form a unitary body. The process imbeds the reinforcements in the body in either case, and also allows rubber to flow to the outside of the tube to form the build-up around the crests of the corrugations. The choice of method will be dictated by economic and manufacturing considerations.

A further modification of the invention is illustrated in FIGURE 9, showing the assembly of the hose prior to cutting into segments. In this case, a single tube 41 is wrapped or blown on the mandrel 11. The tube 41 consists of uncured material, similar in composition to layer 37, but of greater thickness. The spring or wire reinforecement 12, made by one of the methods previously described, is placed over the tube 41. A fabric layer 42, preferably skimmed or frictioned and bias cut, is wrapped around the reinforcement 12 in a similar fashion to the method previously described. The segments are cut and molded as in the other methods, again producing the product of FIGURES 5 and 6 because of flow of rubber through the fabric layer.

The term "elastomeric" as used herein is intended to included the natural and synthetic rubbers and similar materials having elastomeric properties of flexibility and stretchability. Such materials include natural rubber, rubber-like butadiene-styrene and butadiene-acrylic nitrile copolymers, neoprene (polychloroprene), other rubber-like butadiene polymers and copolymers, polyvinyl chloride, and the like. In general, thermoplastic materials capable of flowing under the influence of heat and pressure may be used. Where vulcanizable rubbers are used, they are generally compounded so that they may be cured or vulcanized under heat using sulfur or other known agents, depending upon the specific material.

Other variations in the specific embodiments shown herein may be made without departing from the spirit of the invention.

I claim:

1. A reinforced flexible hose having molded axially spaced external corrugations and troughs therebetween, comprising inner and outer concentric layers of elastomeric material, a helical reinforcing member embedded between said layers and having spaced turns coinciding in an axial direction with the crests of said corrugations, a continuous fabric member outward of said reinforcing member and also embedded between said layers, said outer layer being of greater thickness at the crests of said corrugations than at said troughs.

2. The hose of claim 1 in which said fabric member is in contact with said reinforcing member.

References Cited in the file of this patent

UNITED STATES PATENTS

| | | |
|---|---|---|
| 2,073,335 | Connell | Mar. 9, 1937 |
| 2,371,991 | Harding | Mar. 20, 1945 |
| 2,430,081 | Roberts et al. | Nov. 4, 1947 |
| 2,695,631 | Seck | Nov. 30, 1954 |
| 2,780,273 | Roberts | Feb. 5, 1957 |
| 2,830,622 | Roberts et al. | Apr. 15, 1958 |
| 2,913,011 | Noynes et al. | Nov. 17, 1959 |

FOREIGN PATENTS

| | | |
|---|---|---|
| 157,203 | Australia | June 24, 1954 |